United States Patent
Hayes et al.

(10) Patent No.: US 12,552,353 B2
(45) Date of Patent: Feb. 17, 2026

(54) SYSTEM AND METHOD FOR CONTROLLING A VEHICLE PARKING BRAKE

(71) Applicant: Bendix Commercial Vehicle Systems LLC, Avon, OH (US)

(72) Inventors: Thomas J. Hayes, Lakewood, OH (US); Vishawajeet Sukhadev More, Pune (IN); Richard A. Romer, Grosse Pointe, MI (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 105 days.

(21) Appl. No.: 18/522,355

(22) Filed: Nov. 29, 2023

(65) Prior Publication Data

US 2025/0170999 A1    May 29, 2025

(51) Int. Cl.
*B60T 8/174* (2006.01)
*B60T 7/08* (2006.01)
*B60T 13/68* (2006.01)
B60T 13/38 (2006.01)

(52) U.S. Cl.
CPC .............. *B60T 8/174* (2013.01); *B60T 7/085* (2013.01); *B60T 13/683* (2013.01); *B60T 13/385* (2013.01); *B60T 2220/04* (2013.01)

(58) Field of Classification Search
CPC ........ B60T 8/174; B60T 7/085; B60T 13/683; B60T 13/385; B60T 2220/04
See application file for complete search history.

(56) References Cited

U.S. PATENT DOCUMENTS

| | | | | |
|---|---|---|---|---|
| 5,984,425 | A * | 11/1999 | Orzal | B60T 13/22 303/76 |
| 6,450,587 | B1 * | 9/2002 | MacGregor | B60T 17/16 |
| 6,488,343 | B1 * | 12/2002 | Eberling | B60T 13/683 180/271 |

(Continued)

FOREIGN PATENT DOCUMENTS

JP    2009-274488 A    11/2009

OTHER PUBLICATIONS

English (machine) translation of JP 2009-274488 A.
Bendix Commercial Vehicle Systems LLC, "SD-03-1189 Bendix Inellipark Electronic Park Brake (EPB) System" (May 2022).

*Primary Examiner* — Carl C Staubach
(74) *Attorney, Agent, or Firm* — Reising Ethington P.C.

(57) ABSTRACT

A system for controlling a parking brake in a vehicle includes an operator interface configured to receive inputs from an operator of the vehicle including a first input requesting that the parking brake transition from an applied state to a released state. The system further includes a brake controller configured to identify a condition in which the parking brake should remain in the applied state. The controller generates, in the absence of the condition, a brake control signal responsive to the first input configured to cause the parking brake to transition from the applied state to the released state and transmits the brake control signal to an electromechanical valve configured to control delivery of fluid pressure to the parking brake. The controller disregards, in the presence of the condition, the first input unless the operator enters an override code comprising a predetermined sequence of inputs through the operator interface.

8 Claims, 3 Drawing Sheets

(56) References Cited

U.S. PATENT DOCUMENTS

| | | | | |
|---|---|---|---|---|
| 9,221,350 | B2* | 12/2015 | Kanai | B60L 53/14 |
| 2003/0006644 | A1* | 1/2003 | MacGregor | B60T 13/261 |
| | | | | 303/3 |
| 2004/0124697 | A1* | 7/2004 | MacGregor | B60T 17/18 |
| | | | | 180/271 |
| 2005/0109550 | A1* | 5/2005 | Buglione | B60K 6/48 |
| | | | | 180/65.25 |
| 2007/0254633 | A1* | 11/2007 | Mathew | H04M 1/72418 |
| | | | | 455/412.1 |
| 2016/0104374 | A1* | 4/2016 | Ypma | G07C 9/00182 |
| | | | | 340/5.25 |
| 2018/0362013 | A1* | 12/2018 | Ungermann | B60W 10/182 |
| 2019/0366987 | A1* | 12/2019 | Schwarz | B60T 7/122 |
| 2024/0101080 | A1* | 3/2024 | Oberheu | B60T 15/041 |
| 2024/0208468 | A1* | 6/2024 | Gomez | B60W 50/10 |
| 2024/0239319 | A1* | 7/2024 | M R | B60T 7/085 |
| 2025/0033616 | A1* | 1/2025 | Hayes | B60T 13/662 |
| 2025/0074373 | A1* | 3/2025 | Hayes | B60Q 9/00 |
| 2025/0100524 | A1* | 3/2025 | Lee | B60T 13/686 |

* cited by examiner

SYSTEM AND METHOD FOR CONTROLLING A VEHICLE PARKING BRAKE

BACKGROUND OF THE INVENTION a. Field of the Invention

This disclosure relates to braking systems for vehicles. In particular, this disclosure relates to system and method that limit a vehicle operator's ability to release a vehicle parking brake when certain conditions exist.

b. Background Art

Vehicle wheel brakes are configured to operate both as service brakes in which an operator of the vehicle applies varying amounts of braking force during movement of the vehicle to control movement of the vehicle and as parking brakes in which a braking force is applied to prevent movement of the vehicle. The vehicle operator can typically release the parking brake with few restrictions. There are variety of conditions, however, in which release of the parking brake may create a safety risk to the operator or pedestrians or a risk of damage to the vehicle or other objects. For example, if the vehicle is in the process of fueling, release of the parking brake may disconnect the vehicle from a fuel line and cause a leakage of fuel. If the vehicle is being loaded or unloaded, release of the parking brake may risk the safety of individuals loading or unloading the vehicle and/or a risk of damage to the goods being loaded or unloaded and any equipment being used to assist in loading or unloading the goods. If the vehicle is being used to provide power to an external system (i.e., as a power take-off (PTO)), release of the braking brake may disconnect the connection between the vehicle and the external system. If the vehicle is in an area where vehicle movement is restricted, release of the parking brake may result in movements of the vehicle that are not permitted and/or unexpected, thereby creating risks to individuals and objects near the vehicle. For a tractor-trailer, release of the parking brake may also compromise theft prevention by allowing easier decoupling the tractor and the trailer.

Because there are conditions where release of the parking brake may create safety risks and/or damage to the vehicle or other objects, systems and methods have been developed that restrict the vehicle operator's ability to release the vehicle parking brake when one or more conditions exist. Conventional systems and methods, however, often fail to account for the possibility that there may be a need to release the parking brake even when such conditions exist. For example, the movements of individuals and objects near the vehicle or a change in weather conditions may create additional risks to the safety of the operator or pedestrians or a risk of damage to the vehicle or other objects when the vehicle remains in a parked state that are greater than the risks created by movement of the vehicle.

The inventors herein have recognized a need for a system and method for controlling a vehicle parking brake that will minimize and/or eliminate one or more of the above-identified deficiencies.

BRIEF SUMMARY OF THE INVENTION

This disclosure relates to braking systems for vehicles. In particular, this disclosure relates to system and method that limit a vehicle operator's ability to release a vehicle parking brake when certain conditions exist.

One embodiment of a system for controlling a vehicle parking brake includes an operator interface configured to receive inputs from an operator of the vehicle including a first input requesting that the parking brake transition from an applied state in which the parking brake inhibits movement of the vehicle to a released state in which the parking brake permits movement of the vehicle. The system further includes a brake controller configured to identify a condition in which the parking brake should remain in the applied state. The controller is further configured to generate, in the absence of the condition, a brake control signal responsive to the first input, the brake control signal configured to cause the parking brake to transition from the applied state to the released state, and transmit the brake control signal to an electromechanical valve configured to control delivery of fluid pressure to the parking brake. The controller is further configured to disregard, in the presence of the condition, the first input unless the operator enters an override code comprising a predetermined sequence of inputs through the operator interface.

One embodiment of a method for controlling a vehicle parking brake includes identifying a condition in which the parking brake should remain in an applied state in which the parking brake inhibits movement of the vehicle. The method further includes generating, in the absence of the condition, a brake control signal responsive to a first input entered by an operator of the vehicle through an operator interface, the first input requesting that the parking brake transition from the applied state to a released state in which the parking brake permits movement of the vehicle, the brake control signal configured to cause the parking brake to transition from the applied state to the released state, and transmitting the brake control signal to an electromechanical valve configured to control delivery of fluid pressure to the parking brake. The method further includes disregarding, in the presence of the condition, the first input unless the operator enters a first override code comprising a predetermined sequence of inputs through the operator interface.

A system and method for controlling a vehicle parking brake in accordance with the teachings disclosed herein is advantageous relative to conventional systems and methods. In particular, the system and method restrict the operator's ability to release the parking brake in conditions where doing so may create a safety risk to the operator or other individuals and/or a risk of damage to the vehicle and other objects within or near the vehicle. The system and method, however, permit those restrictions to be overridden when necessary using an override code known by a limited set of individuals and systems.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
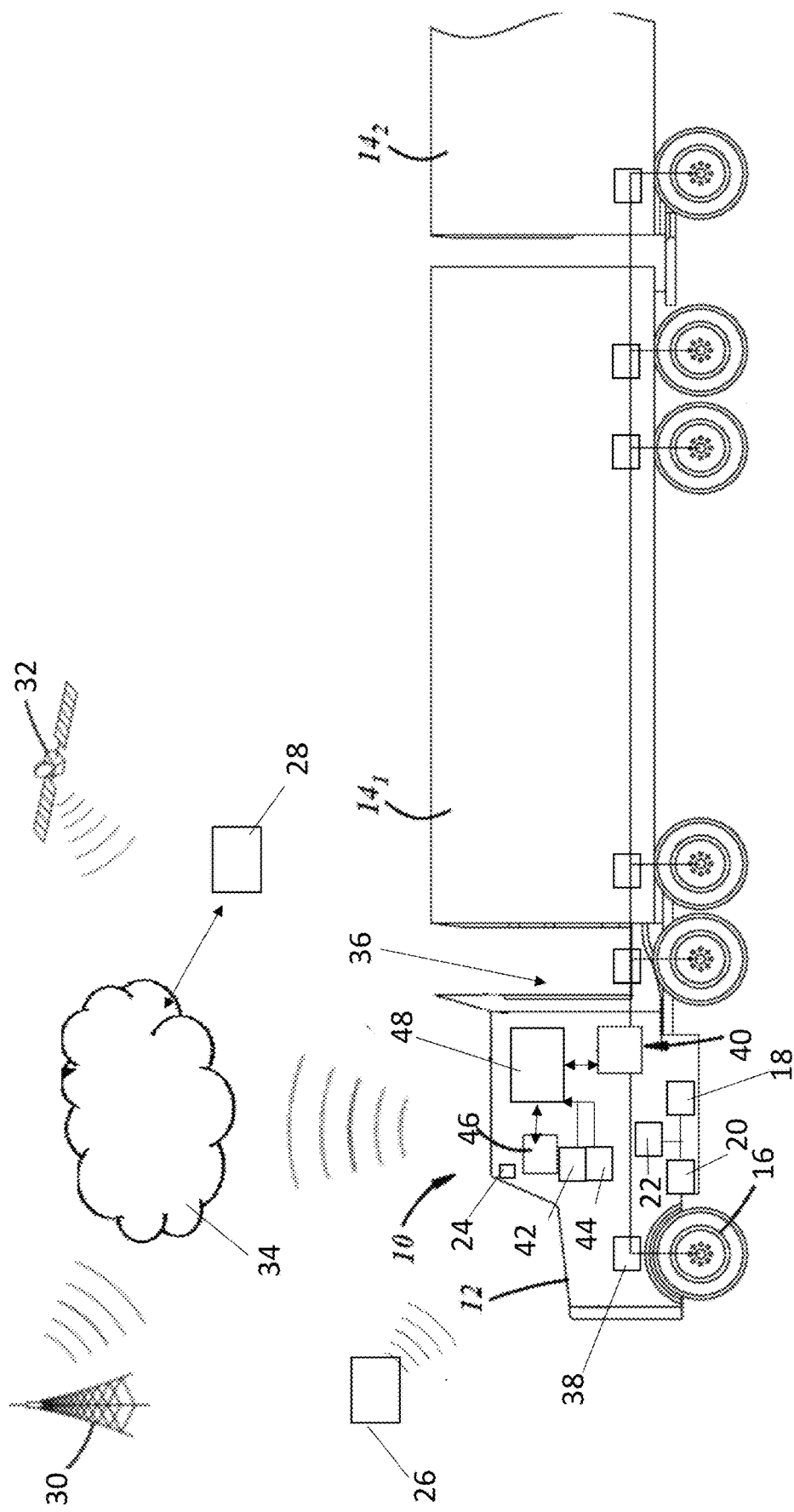
FIG. 1 is a diagrammatic view of a tractor-trailer incorporating one embodiment of a system for controlling a vehicle parking brake in accordance with the teachings set forth herein.

Referring now to the drawings wherein like reference numerals are used to identify identical components in the various views, FIG. 1 illustrates a vehicle 10. In the illustrated embodiment, vehicle 10 comprises a heavy commercial vehicle and, in particular, a tractor-trailer (also referred to as a semi) containing a tractor or power unit 12 and one or more trailers or towed units $14_1 \ldots 14_N$. It should be understood, however, that the systems and methods disclosed herein may find application on other types of commercial vehicles including, for example, tractors operating without trailers, buses, etc. and may also find application on non-commercial vehicles.

Tractor 12 provides power for moving trailers 14. Tractor 12 includes steering and drive axles each of which support one or more wheels 16 at either end. Tractor 12 further includes a power unit 18 such as an internal combustion engine or motor for generating mechanical energy used to rotate wheels 16. Tractor 12 further includes a battery 20 that provides electrical energy for use by various systems in vehicle 10 including, for example, lighting systems, power windows, locks and seating, and operator interface elements. Battery 20 also provides electrical energy for use in starting the power unit 18 and for use by the power unit 18 in generating the mechanical energy used to drive wheels 16. A start or ignition switch 22 in the cabin of tractor 12 and controlled by the operator of vehicle 10 controls a relay (not shown) used to deliver electrical energy from battery 20 to power unit 18 to transition vehicle 10 between an inactive state in which battery 20 does not provide electrical energy to power unit 18 and, therefore, power unit 18 cannot generate mechanical energy to rotate wheels 16 and an active state in which battery 20 provides electrical energy to power unit 18 to allow power unit to generate the mechanical energy required to rotate wheels 16.

Tractor 12 may further include a telecommunications system 24 for transmitting information to, and receiving information from, locations remote from the vehicle 10. Telecommunications system 24 enables communication between vehicle 10 and other vehicles (V2V communication), road infrastructure (V2I communication) and end users (e.g., fleet managers and vehicle service providers) over various telecommunications networks. System 24 enables wireless voice and/or data communication over a wireless carrier system and via wireless networking. In some embodiments, system 24 may comprise or form a part of a vehicle telematics unit used to provide a diverse range of services including turn-by-turn directions and other navigation-related services that are provided in conjunction with a GPS-based vehicle navigation system, airbag deployment or collision notification and other emergency or roadside assistance-related services, and diagnostic reporting using information obtained from various vehicle control systems. In accordance with one aspect of the systems and methods disclosed herein, system 24 may be configured to receive a signal from a source 26 remote from vehicle 10 indicative of a condition in which a parking brake on vehicle 10 should assume, or remain in, an applied state in which the parking brake inhibits movement of vehicle 10 rather than assuming, or transitioning to, a released state in which the parking brake permits movement of vehicle 10. For example, vehicle 10 may be in an area in which movement of vehicle 10 is restricted due to space constraints, security, etc. Source 26 may, for example, comprise a monitoring system including cameras or other position sensors for detecting the positions of vehicle 10 and other people and objects in the immediate area, a processor for identifying potential safety issues based on the relative positions and a transmitter for sending a signal to vehicle 10 including either a command for a parking brake on vehicle 10 to assume, or remain in, an applied state or data from which vehicle 10 can determine whether or not the parking brake on vehicle 10 should assume, or remain in, an applied state. In accordance with another aspect of the systems and methods disclosed herein, system 24 may be configured to transmit a signal to a destination 28 remote from vehicle 10, such as a computing device associated with a fleet manager, that contains an override code (discussed in greater detail below) that can be used by an operator of vehicle 10 to transition a parking brake in vehicle 10 from an applied state to a released state in situations where release of the parking brake and movement of vehicle 10 would otherwise be prohibited.

System 24 may include a short-range wireless communication transceiver for communicating with systems on vehicle 10 and for communication with other vehicles and road infrastructure, such as source 26, that are configured for communication over a relatively short distance using short-range wireless technologies such as Wi-Fi (IEEE 802.11), WiMAX, Wi-Fi direct, Bluetooth, Zigbee, near field communication (NFC), etc. and that transmit and receive signals through an antenna. The transceiver may be configured to allow vehicle to vehicle communication in accordance with Society of Automotive Engineering (SAE) Standard J2945 directed to Dedicated Short Range Communication. System 24 may further include a long-range wireless communication transceiver that is configured for communication over longer distances through a cellular communications network 30 or satellite communication network 32 for vehicle navigation, diagnostic reporting, fleet management and other purposes. The transceiver may, for example, be configured for cellular communication according to either GSM, CDMA, UMTS or LTE standards and therefore include a standard cellular chipset for voice communications, a wireless modem (not shown) for data transmission, and a radio transceiver that transmits signals to and receives signals from a dual antenna for wireless communication with network 30. Using communication networks 30, 32, system 24 may be connected to a telecommunications network 34 and, through network 34, to various computing devices including those, such as destination 28, used in fleet management of vehicle 10 and other vehicles in a fleet. Network 34 may include a public switched telephone network (PSTN) such as that used to provide hardwired telephony, packet-switched data communications, and the Internet infrastructure. One or more segments of network 34 could be implemented through the use of a standard wired network, a fiber or other optical network, a cable network, power lines, other wireless networks such as wireless local area networks (WLANs), or networks providing broadband wireless access (BWA), or any combination thereof. The computing devices may comprise, for example, servers (including file servers, web servers, or network address servers) or client computing devices and may be used for a wide variety of purposes including, for example, accessing or receiving vehicle data for use in diagnosing and servicing vehicle 10, setting up or configuring vehicle 10, controlling vehicle functions and connecting the vehicle operator to human advisors, automated voice response systems, databases, and the like used in providing, for example, information, emergency or roadside assistance services and vehicle diagnostic services.

Trailers $14_1 \ldots 14_N$ are provided to store freight and are detachably coupled to tractor 12. Each trailer 14 is supported on one or more trailer axles, each of which may support one or more wheels 16 at either end. Although a pair of trailers 14 are shown in the illustrated embodiment, it should be understood that the number of trailers 14 attached to tractor 12 may vary.

In accordance with the teachings herein, vehicle 10 further includes a system 36 for controlling braking in vehicle 10 and, in particular, controlling a parking brake of vehicle 10. System 36 is configured to brake one or more wheels 16 in order to slow, stop or prevent movement of vehicle 10. System 36 is configured to brake vehicle 10 in response to commands from an operator of vehicle 10, but may also be configured to implement autonomous braking (i.e., without commands from the operator of vehicle 10) as part of an advanced driver assistance system (ADAS) or automated driving system (ADS) in order to provide various functions such as automated emergency braking (AEB), anti-lock braking (ABS), collision avoidance, adaptive cruise control, traction control or stability control. Braking system 36 may include one or more wheel brakes 38, a fluid circuit 40 that supplies fluid pressure to wheel brakes 38, sensors 42 and/or systems 44 that identify various conditions associated with vehicle 10 and the surrounding environment and that impact braking of vehicle 10, an operator interface 46 and one or more controllers 48. Although braking system 36 is described herein as a fluid braking system and, in particular, a pneumatic braking system, it should be understood that the system and method for controlling a parking brake of vehicle 10 described hereinbelow could find application in connection with other forms of braking systems.

Wheel brakes 38 are configured to apply a braking force to one or more wheels 16. Brakes 38 may comprise disc brakes in which a carrier supports brake pads on opposite sides of a rotor rotating with the wheel 16 and an actuator causes, responsive to fluid pressure delivered by fluid circuit 40 or another force, movement of a caliper relative to the carrier to move the brake pads into and out of engagement with the rotor. Alternatively, wheel brakes 38 may comprise drum brakes in which an actuator such as a cam or piston causes, responsive to fluid pressure delivered by fluid circuit 40 or another force, movement of one or more brake shoes into engagement with a braking surface in a brake drum rotating with the wheel 16. Wheel brakes 38 may be configured to function as both a service brake for applying service braking while vehicle 10 is an active state and as a parking brake for applying parking or emergency braking while vehicle 10 is an active or inactive state.

Figure 2:
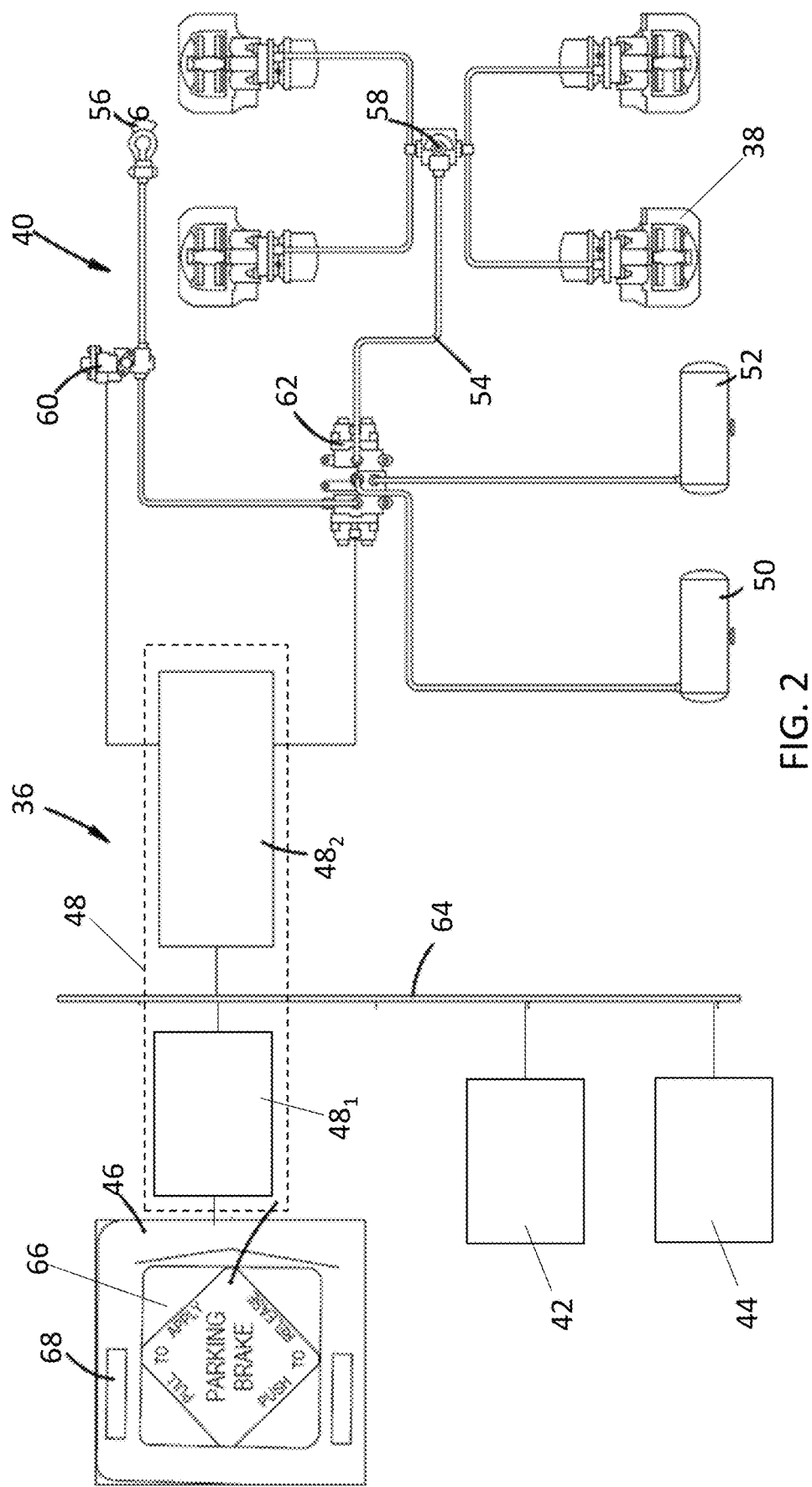
FIG. 2 is a diagrammatic view of a system for controlling a vehicle parking brake in accordance with the teachings set forth herein

Fluid circuit 40 generates fluid pressure within system 36 and controls the delivery of fluid pressure to the actuator of each wheel brake 38 to release the parking brake (a separate fluid circuit (not shown) generate fluid pressure within system 36 and controls the delivery of fluid pressure to the actuator of each wheel brake for use in service braking). Referring to FIG. 2, circuit 40 may include components for generating and storing pressurized fluid including fluid reservoirs 50, 52, compressors and air dryers and components for routing and delivering fluid pressure to wheel brakes 38 including fluid conduits 54, glad-hand connectors 56 between the tractor 12 and trailers 14, and a variety of valves including, for example, a quick release valve 58, a tractor protection valve 60 and a parking control valve 62. Quick release valve 58 increases the speed at which fluid pressure is exhausted from wheel brakes 38 on the drive axle when brakes 38 are released. Tractor protection valve 60 transmits pneumatic signals relating to operation of the trailer wheel brakes from tractor 12 to trailers 14 to enable control of the wheel brakes 38 on trailers 14 by system 36. Valve 60 also protects the fluid supply for tractor 12 in the event of a brake in the fluid connection between tractor 12 and trailers 14. Parking control valve 62 delivers fluid to, and exhausts fluid from, wheel brakes 38 on both the drive axles in the tractor and the trailer axles in the trailer(s) (through tractor protection valve 60 and glad hand connector 56) in order to implement parking brakes in tractor 12 and trailer(s) 14. When valve 62 delivers fluid pressure to an actuator for a wheel brake 38, the fluid pressure opposes a spring force in the actuator to release the parking brake. When valve 62 exhausts fluid from the actuator for the wheel brake 38, the spring force sets the parking brake. Valves 60 and 62 comprise electromechanical vales and may operate under the control of controller 48. A more detailed description of exemplary fluid circuits may be found in commonly assigned U.S. Pub. Nos. 2019/0299946 A1 and 2020/0114896 A1, the entire disclosures of which are incorporated herein by reference.

Sensors 42 are provided to identify various conditions associated with vehicle 10 and the surrounding environment including conditions that may impact the operation of braking system 36. Systems 44 are provided to monitor or control the operation of vehicle 10 and components of vehicle 10. Sensors 42 and systems 44 may communicate with one another in a variety of ways including over a communication bus 64 implementing a communications network such as a controller area network (CAN) or local interconnect network (LIN) or over a vehicle power line through power line communication (PLC).

In accordance with one aspect of the systems and methods disclosed herein, sensors 42 and/or systems 44 may generate signals indicative of conditions in which vehicle 10 should remain in a parked state and, therefore, in which the parking brake of vehicle 10 should remain in an applied state. Sensors and systems 44 therefore represent a source for such signals on board vehicle 10 as opposed to remote from vehicle 10 as in source 26 discussed hereinabove. For example, certain sensors 42 and/or systems 44 may monitor the position of fuel system components (e.g., valves) or fuel levels and generate signals that indicate vehicle 10 is in the process of refueling and, therefore, that the parking brake should remain in an applied state to prevent movement of vehicle 10 and disconnection of vehicle 10 from a refueling line and the leakage of fuel. Other sensors 42 and/or systems 44 may monitor or control the position of doors or hatches in trailers 14 or the monitor the weight of loads in trailers 14 and generate signals that indicate vehicle 10 is the process of being loaded or unloaded and, therefore, that the parking brake should remain in an applied state to prevent movement of vehicle 10 and reduce safety risks to individuals loading or unloading vehicle 10 and/or a risk of damage to the goods being loaded or unloaded and any equipment being used to assist in loading or unloading the goods. Other sensors 42 and/or systems 44 may monitor and/or control the transmission of power from vehicle 10 to a system remote from vehicle 10 and generate signals that indicate vehicle 10 is being used as a power take-off (PTO) and, therefore, that the parking brake should remain in an applied state to prevent movement of vehicle 10 and disconnection between vehicle 10 and the remote system. Other sensors 42 and/or systems 44 may monitor the position of vehicle 10 and nearby persons or objects and generate signals that indicate movement of vehicle 10 would create a risk of collision with a person or object and, therefore, that the parking brake should remain in an applied state to prevent movement of vehicle 10 and any collisions between vehicle 10 and other persons or objects. Other sensors 42 and/or systems 44 may act as interlock sensors or systems and monitor the status of various components of vehicle 10 (for example, the cabin door, driver seat and/or seat belt) and generate signals indicative of the absence of the vehicle operator and, therefore, that the parking brake should remain in an applied state to prevent uncontrolled movement of vehicle 10. It should be understood that the sensors 42 and 44 described above are exemplary only and a wide variety of sensors 42 and 44 may generate signals indicating that vehicle 10 should remain a parked state and that the parking brake should therefore remain in an applied state to prevent movement of vehicle 10.

In accordance with another aspect of the systems and methods disclosed herein, one or more sensors 42 and/or systems 44 may generate signals indicating that vehicle 10 has moved from an inactive state to an active state. A variety of different sensors 42 and/or systems 44 may be used to generate signals indicating that vehicle 10 has moved from an inactive state to an actives state. As noted above, vehicle 10 moves from an inactive state to an active state when battery 20 provides electrical energy to power unit 18 to allow power unit 18 to generate mechanical energy to rotate wheels 16. Therefore, position sensors indicative of the position or state of start or ignition switch 22, voltage or current sensors indicative of the delivery of voltage or current from battery 20 to power unit 18, sensors indicative of the operation of power unit 18 or exhaust systems (in vehicles where power unit 18 comprises an internal combustion engine) and positions sensors indicative of the movement of wheels 16 or power transmission elements between wheels 16 and power unit 18 all may provide an indication that vehicle 10 has moved from an inactive state to an active state. It should again be understood that the sensors 42 and 44 described above are exemplary only and a wide variety of sensors 42 and 44 may generate signals indicating that vehicle 10 has moved from an inactive state to an active state.

Operator interface 46 provides an interface between the vehicle operator and system 36 through which the operator can control certain vehicle braking functions and receive information about vehicle braking. In the illustrated embodiment, interface 46 is provided to control the parking brake function of certain wheel brakes 38. In particular, interface 46 is used by the vehicle operator to request application of the parking brake (e.g., by exhausting fluid from a brake actuator for a wheel brake 38 to allow a spring to apply the parking brake) and release of the parking brake (e.g., by delivering fluid to the brake actuator for the wheel brake 38 opposing the spring to release the parking brake). Interface 46 may be mounted within the cabin of tractor 12 of vehicle 10 and, in particular, on the dashboard of vehicle 10. Interface 46 may include a handle 66 movable between a "pull" position (to apply the parking brake in the illustrated embodiment) and a "push" position (to release the parking brake in the illustrated embodiment) and a neutral position between the "push" and "pull" positions. When the operator actuates interface 46 and moves handle 66 to either a "pull" or "push" position, interface 46 generates and transmits a brake command signal to controller 48 to apply or release brakes 38. When the operator does not actuate interface 46 and handle 66 remains in the neutral position, interface 46 does not generate or transmit a brake command signal to controller 48. Interface 46 may include further include light emitters 68, such as light emitting diodes, sound emitters, such as a speaker, and/or haptic actuators to convey visual, audio and/or haptic messages to the vehicle operator. In the case of visual alerts, different information can be conveyed through differences in color, differences in intensity, differences in the number of lights, and differences in the pattern of activation of the lights. In the case of audio alerts, different information can be conveyed through differences in the type of sound generated, differences in volume and differences in the pattern of sounds. In the case of haptic alerts, different information can be conveyed through differences in the length, intensity or pattern of vibration. Although a particular form of operator interface 36 is disclosed herein, it should be understood that the form of operator interface 36 may vary. Interface 36 could for example comprise one or more push buttons or switches, each of which may assume an applied (or depressed) position and a released position. Alternatively, operator interface 36 may comprise a touch screen display with a graphical user interface (GUI).

Controller 48 controls the operation of fluid circuit 40 in order to control the fluid pressure delivered to wheel brakes 38 and, therefore, the braking force applied to the wheels 16. In this manner, controller 48 may be configured to implement parking/emergency braking and service braking as well as anti-lock braking (ABS), traction control and stability control when required. Controller 48 may also control the outputs of certain user interfaces including operator interface 46. Controller 48 may comprise a programmable microprocessor or microcontroller or may comprise an application specific integrated circuit (ASIC). Controller 48 may include a memory and a central processing unit (CPU). Controller 48 may also include an input/output (I/O) interface including a plurality of input/output pins or terminals through which the controller 48 may receive a plurality of input signals and transmit a plurality of output signals. The input signals may include signals received from sensors 42 and systems 44 and user interfaces such as operator interface 46. The output signals may include signals used to control components of fluid circuit 40 such as valves 60, 62 and signals used to control outputs on user interfaces such as operator interface 46. Controller 48 may be configured to communicate with one or more components of braking system 36 such as fluid circuit 40, sensors 42, systems 44 and operator interface 46 directly using dedicated (hard) wire connections. Alternatively, or in addition, controller 48 may be configured to communicate with one or more components of braking system 36 such as fluid circuit 40, sensors 42, systems 44 and operator interface 46 using bus 64 and to communicate with other vehicle systems over the same or a similar bus including, for example, advanced driver assistance systems such as collision avoidance systems that are configured to implement automated emergency braking of the vehicle wheels 16 under certain conditions. Communications may be carried out over the communications bus 64 in accordance with various industry standard protocols including by not limited to SAE J1939, SAEJ1922, and SAE J2497 or using a proprietary protocol.

It should be understood that the functions of controller 48 may be divided among multiple controllers located on tractor 12 and trailers 14 that are in communication with one another. In the illustrated embodiment, for example, controller 48 includes a pair of controllers $48_1$, $48_2$ configured for communication with one another over, for example, bus 64. Controller $48_1$ is associated with operator interface 46 and is configured to, among other things, receive inputs entered through operator interface 46 and to generate and transmit brake command signals to controller 48₂ in response to those inputs in order to cause application or release of the parking brake in wheel brakes 38. Controller 48₂ is configured to generate brake control signals causing application or release of the parking brake in wheel brakes 38. Controller 48₂ may generate brake control signals responsive to the brake command signals from controller 48₁, but may also comprise part of an advanced driver assistance system (ADAS) or automated driving system (ADS) configured to generate brake control signals autonomously in response to inputs other than those from the operator of vehicle 10, including from sensors 42 and systems 44, to provide various functions such as automated emergency braking (AEB), anti-lock braking (ABS), collision avoidance, adaptive cruise control, traction control or stability control.

Figure 3:
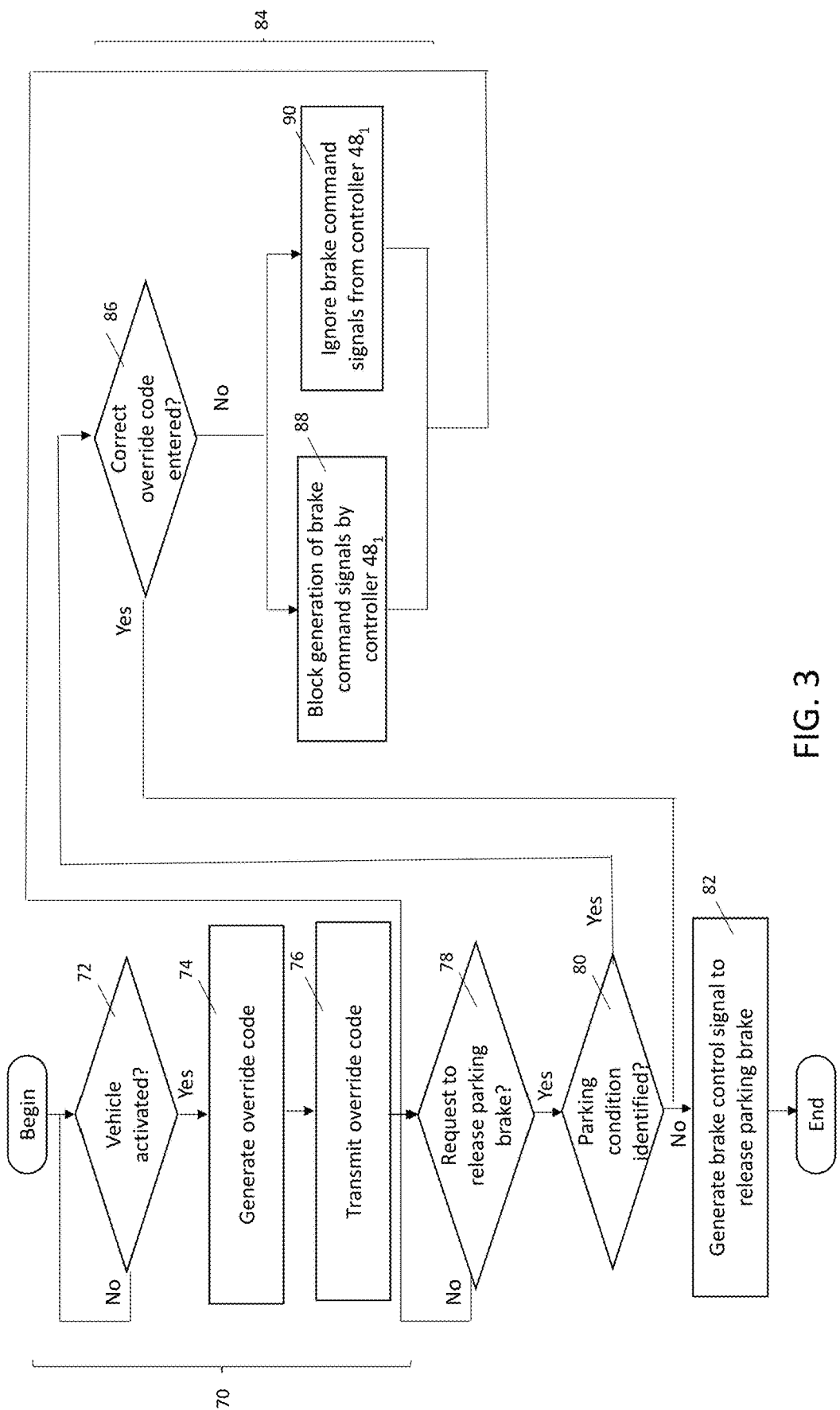
FIG. 3 is flow chart diagram illustrating several steps in one embodiment of a method for controlling a vehicle parking brake in accordance with the teachings set forth herein.

Referring now to FIG. 3, controller 48 may be configured with appropriate programming instructions (i.e., software or a computer program) to implement various steps in a method for controlling a parking brake in vehicle 10. The instructions or computer program may be encoded on a non-transitory computer storage medium such as a memory within, or accessible by, controller 48. The program and method are intended to prevent release of the parking brake in wheel brake 38 despite any operator commands to release the parking brake whenever conditions are identified in which the parking brake should assume, or remain in, an applied state unless the operator enters a predetermined override code. The method may begin with the step 70 of establishing an override code. Step 70 may include several substeps 72, 74, 76

In accordance with one aspect of the systems and methods disclosed herein, an override code is established upon activation of vehicle 10. Therefore, in substep 72, controller 48 may determine whether an activation of vehicle 10 has occurred. As noted above, vehicle 10 moves from an inactive state to an active state when battery 20 provides electrical energy to power unit 18 to allow power unit 18 to generate mechanical energy to rotate wheels 16. In certain embodiments, controller 48 may determine that activation of vehicle 10 has occurred based on the delivery of power to controller 48 from an external power source such as battery 20. In other embodiments, controller 48 may be configured to receive a signal from one of sensors 42 or systems 44 indicative of the activation of vehicle 10. As noted above, a variety of sensors 42 and systems 44 may produce signals indicative of this movement from an inactive state to an active state including position sensors indicative of the position or state of start or ignition switch 22, voltage or current sensors indicative of the delivery of voltage or current from battery 20 to power unit 18, sensors indicative of the operation of power unit 18 or exhaust systems (in vehicles where power unit 18 comprises an internal combustion engine) and positions sensors indicative of the movement of wheels 16 or power transmission elements between wheels 16 and power unit 18. It should be understood that conditions other than activation of vehicle 10 may be used to trigger generation of an override code. In some embodiments, for example, the override code may only remain valid for a predetermined period of time or a predetermined travel distance of vehicle 10 after activation of vehicle 10. Controller 48 may, therefore, be configured to generate a new override code once the predetermined period of time or predetermined travel distance of vehicle 10 has passed.

Once controller 48 determines that vehicle 10 has been activated, controller 48 generates the override code in substep 74. The override code corresponds to a predetermined sequence of inputs to be entered through operator interface 46. The override code will therefore be dependent on the type of operator interface in vehicle 10. In the case of the operator interface 46 shown in FIG. 2, the inputs may comprise a sequence of movements or actuations of handle 66 between the "pull" position, "push" position and "neutral" position. In other embodiments, the override code may comprise actuation of a sequency of keys or buttons or contact with various locations in a touch screen display. In accordance with one aspect of the systems and methods disclosed herein, each override code is preferably unique. At the very least, the override code is different from an override code established in the most recent activation of vehicle 10 prior to the current activation of vehicle 10. It should be understood, however, that additional safeguards could be established to prevent reuse of override codes (e.g., the same override code cannot be used more than once within a predetermined number of activations of vehicle 10, a predetermined period of time or a predetermined travel distance for vehicle 10). Controller 48 may generate the override code using a random generator selecting from available inputs to the operator interface 46 or may select, either randomly or in a predetermined order, from a list of predetermined override codes stored in a data structure in a memory for controller 48 or an external memory.

In substep 76, controller 48 may transmit the generated override code to one more destinations. Referring to FIG. 2, in the illustrated embodiment in which the functionality of controller 48 is divided among controllers 48₁ and 48₂, the override code may be generated by controller 48₂ in substep 74 and transmitted to controller 48₁ where the override code may be stored for subsequent comparison against inputs made through operator interface 46. Controller 48 may further transmit the override code to a destination from which the vehicle operator can obtain the override code. Where operator interface 46 is configured in a manner that will allow the override code to be directly conveyed to the vehicle operator (e.g., a display screen), controller 48 may transmit the override code to operator interface 46. Controller 48 may further transmit the override code to destinations remote from vehicle 10 through telecommunications system 24 such as a destination 28 so that, for example, the codes are only known to a fleet manager who will then have the ability to provide the code to a vehicle operator at the discretion of the fleet manager.

Once vehicle 10 has been activated and the override code generated, the method may continue with the steps 78, 80 of determining whether the operator has submitted a request to move the parking brake from the applied state to the released state and, if so, identifying any conditions in which the parking brake should nevertheless remain in an applied state. In the embodiment illustrated in FIG. 3, step 78 precedes step 80. It should be understood, however, that these actions may be independent of one another in other embodiments. In particular, step 80 may alternatively be performed before any request to move the parking brake from the applied state to the released state has been made by the operator in step 78. Conditions in which the parking brake should remain in the applied state may arise before or after movement of vehicle 10 has begun following activation of vehicle 10. In particular, upon activation of vehicle 10, the parking brake will typically already be in an applied state until the parking brake is released by controller 48. Therefore, conditions in which the parking brake should remain is the applied state may be identified before vehicle 10 has transitioned to an unparked state and moved from the position where vehicle 10 was activated. Alternatively, vehicle 10 may move from the position where vehicle 10 was activated and be brought to a stop at a different position where the parking brake in wheel brake 38 is then reapplied to transition vehicle 10 from an unparked state to a parked state. Conditions in which the parking brake should remain in an applied state may also be identified at this time.

A variety of conditions may exist in which the parking brake on vehicle 10 should remain in an applied state to avoid creating a safety risk to the operator or pedestrians or a risk of damage to vehicle 10 or other objects. For example, if vehicle 10 is in the process of fueling, release of the parking brake may disconnect vehicle 10 from a fuel line and cause a leakage of fuel. Controller 48 may identify this condition responsive to signals received from sensors 42 and/or systems 44 on vehicle 10 that monitor the position of fuel system components (e.g., valves) on vehicle 10 or fuel levels in vehicle 10 and generate signals that indicate vehicle 10 is in the process of refueling. If vehicle 10 is being loaded or unloaded, release of the parking brake may risk the safety of individuals loading or unloading vehicle 10 and/or a risk of damage to the goods being loaded or unloaded and any equipment being used to assist in loading or unloading the goods. Controller 48 may identify this condition responsive to signals received from sensors 42 and/or systems 44 on vehicle 10 that monitor or control the position of doors or hatches in trailers 14 or that monitor the weight of loads in trailers 14 and generate signals that indicate vehicle 10 is the process of being loaded or unloaded. If vehicle 10 is being used to provide power to an external system (i.e., as a power take-off (PTO)), release of the braking brake may disconnect the connection between vehicle 10 and the external system. Controller 48 may identify this condition responsive to signals received from sensors 42 and/or systems 44 on vehicle 10 that monitor and/or control the transmission of power from vehicle 10 to a system remote from vehicle 10 and generate signals that indicate vehicle 10 is being used as a power take-off (PTO). If the operator is not present, movement of vehicle 10 may create a risk to individuals (including the operator) and objects near vehicle 10. Controller 48 may identify this condition responsive to signals received from interlock sensors 42 and/or systems 44 on vehicle 10 that monitor components indicative of the presence of the operator such as cabin door position sensors, seat weight sensors, seat belt position sensors. If vehicle 10 is in an area where vehicle movement is restricted, release of the parking brake may result in movements of vehicle 10 that are not permitted and/or unexpected thereby creating risks to individuals and objects near vehicle 10. Controller 48 may identify this condition responsive to signals received from sensors 42 and/or systems 44 that monitor the position of vehicle 10 and nearby persons or objects and generate signals that indicate movement of vehicle 10 would create a risk of collision with a person or object. In accordance with one aspect of the systems and method disclosed herein, controller 48 may alternatively identify this condition responsive to signals received from a source 26 remote from vehicle 10. As noted above, source 26 may, for example, comprise a monitoring system for an area including cameras or other position sensors for detecting the positions of vehicle 10 and other people and objects in the immediate area, a processor for identifying potential safety issues based on the relative positions and a transmitter for sending a signal to vehicle 10 including either a command for the parking brake to remain in an applied state or data from which controller 48 can determine whether or not the parking brake should remain in an applied state. It should be understood that the conditions identified herein are exemplary only and that a variety of other conditions may exist that indicate vehicle 10 should remain a parked state.

In the absence of any condition indicating that the parking brake should remain in an applied state, when an operator of vehicle 10 inputs a request through operator interface 46 to transition the parking brake to a released state, the method may continue with the step 82 of generating a brake control signal responsive to the input and transmitting that signal to a valve such as valve 60 or 62 in order to control delivery of fluid pressure to wheel brake 38 and release the parking brake.

In the presence of a condition indicating that the parking brake should remain in an applied state, when an operator of vehicle 10 inputs a request through operator interface 46 to transition the parking brake to a released state, the method may continue with the step 84 of disregarding the input unless the operator also enters a predetermined sequence of inputs through operator interface 46 corresponding to the override code established in step 70. Step 84 may be implemented in several different ways.

Step 84 may begin with the substep 86 of determining whether the operator has entered the override code. In the embodiment illustrated in FIG. 2, controller $48_1$ may compare inputs entered by the operator through operator interface 46 to the override code stored in the memory of controller $48_1$ in substep 76 of step 70. If controller $48_1$ determines that the operator has entered the override code, the method may proceed to step 82 and controller $48_1$ may transmit an override signal to controller $48_2$. Upon receipt of an override signal, controller $48_2$ will implement any brake command signal received from controller $48_1$ as a result of an input by the operator through operator interface 46 requesting that the parking brake transition from an applied state to a released state—despite having previously identified a condition indicating the parking brake should remain in an applied state in step 80.

If the operator has not entered the override code, step 84 may proceed to either of substeps 88, 90. In one embodiment, illustrated in substep 88, controller $48_2$ transmits a blocking signal to controller $48_1$. Controller $48_1$ is configured to, upon receipt of the blocking signal from controller $48_2$, to ignore any inputs through operator interface 46 requesting that the parking brake transition from an applied state to a released state. As a result, controller $48_1$ will not generate or transmit any brake command signals to controller $48_2$ responsive to such inputs once the blocking signal is received from controllers $48_2$. To the extent, controller $48_1$ has been configured to ignore inputs through operator interface 46 requesting that the parking brake move from an applied state to a released state as a result of any blocking signal in substep 84, controller $48_1$ may be reconfigured upon entry of the override code to again generate and transmit brake command signals to controller $48_2$ responsive to such inputs. In another embodiment, illustrated in substep 90, controller $48_1$ continues to generate brake command signals responsive to inputs through operator interface 46 requesting that the parking brake transition from an applied state to a released state, but controller $48_2$ simply ignores any such signals received from controller $48_1$.

Controllers $48_1$, $48_2$ may generate and transmit certain signals indicative of the request by the operator even if the request is not implemented. For example, controller $48_1$ may generate and transmit a signal to operator interface 46 to communicate acknowledgment of the request to the operator of vehicle 10 and may further generate and transmit a signal to operator interface 46 to communicate to the operator that the request will not be implemented. Controller $48_2$ may generate and transmit signals to controller $48_1$ indicating that the request will not be implemented (which may again cause controller $48_1$ to generate and transmit a signal to operator interface 46 to communicate that the request will not be implemented) or through communications system 24 to destination 28 to communicate to a fleet manager that a request made by the operator will not be implemented.

A system 36 and method for controlling a vehicle parking brake in accordance with the teachings disclosed herein is advantageous relative to conventional systems and methods. In particular, the system 36 and method restrict the operator's ability to release the parking brake in conditions where doing so may create a safety risk to the operator or other individuals and/or a risk of damage to the vehicle 10 and other objects within or near the vehicle 10. The system 36 and method, however, permit those restrictions to be overridden when necessary using a code known by a limited set of individuals and systems.

While the invention has been shown and described with reference to one or more particular embodiments thereof, it will be understood by those of skill in the art that various changes and modifications can be made without departing from the spirit and scope of the invention.

What is claimed is:

1. A system for controlling a parking brake in a vehicle, comprising:
    an operator interface configured to receive inputs from an operator of the vehicle including a first input requesting that the parking brake transition from an applied state in which the parking brake inhibits movement of the vehicle to a released state in which the parking brake permits movement of the vehicle; and,
    a brake controller configured to
        identify a condition in which the parking brake should remain in the applied state;
        generate, in the absence of the condition, a brake control signal responsive to the first input, the brake control signal configured to cause the parking brake to transition from the applied state to the released state, and transmit the brake control signal to an electromechanical valve configured to control delivery of fluid pressure to the parking brake; and,
        disregard, in the presence of the condition, the first input unless the operator enters a first override code comprising a predetermined sequence of inputs through the operator interface
    wherein the controller is further configured, in identifying the condition, to identify the condition responsive to a signal from a source remote from the vehicle
    wherein the controller includes
        a first controller configured to generate the brake control signal; and,
        a second controller configured to receive the first input and to transmit a brake command signal to the first controller responsive to the first input and
    wherein, in the presence of the condition, the first controller transmits a blocking signal to the second controller configured to prevent transmission of the brake command signal in response to the first input.

2. The system of claim 1 wherein the controller is further configured to establish the first override code upon a first activation of the vehicle.

3. The system of claim 2 wherein the first override code is different from a second override code established upon a second activation of the vehicle.

4. The system of claim 1 wherein the controller is further configured to transmit the first override code to a destination remote from the vehicle.

5. A method for controlling a parking brake in a vehicle, comprising:
    identifying a condition in which the parking brake should remain in an applied state in which the parking brake inhibits movement of the vehicle;
    generating, in the absence of the condition, a brake control signal responsive to a first input entered by an operator of the vehicle through an operator interface, the first input requesting that the parking brake transition from the applied state to a released state in which the parking brake permits movement of the vehicle, the brake control signal configured to cause the parking brake to transition from the applied state to the released state, and transmitting the brake control signal to an electromechanical valve configured to control delivery of fluid pressure to the parking brake; and,
    disregarding, in the presence of the condition, the first input unless the operator enters a first override code comprising a predetermined sequence of inputs through the operator interface
    wherein identifying the condition includes identifying the condition in response to a signal from a source remote from the vehicle
    wherein the brake control signal is generated by a first controller and the first input is received by a second controller that transmits a brake command signal to the first controller responsive to the first input and wherein, in the presence of the condition, the first controller transmits a blocking signal to the second controller configured to prevent transmission of the brake command signal in response to the first input.

6. The method of claim 5, further comprising establishing the first override code upon a first activation of the vehicle.

7. The method of claim 6 wherein the first override code is different from a second override code established upon a second activation of the vehicle.

8. The method of claim 6, further comprising transmitting the first override code to a destination remote from the vehicle.

* * * * *